(12) United States Patent
Li et al.

(10) Patent No.: US 12,159,531 B2
(45) Date of Patent: *Dec. 3, 2024

(54) SYSTEM AND METHOD FOR DILEMMA ZONE MITIGATION AT SIGNALIZED INTERSECTIONS

(71) Applicant: Purdue Research Foundation, West Lafayette, IN (US)

(72) Inventors: Haoxiang Li, West Lafayette, IN (US); Mathew Jijo Kulathintekizhakethil, West Lafayette, IN (US); Tom Platte, Indianapolis, IN (US)

(73) Assignee: Purdue Research Foundation, West Lafayette, IN (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/217,577

(22) Filed: Jul. 2, 2023

(65) Prior Publication Data
US 2024/0005784 A1   Jan. 4, 2024

Related U.S. Application Data

(63) Continuation of application No. 16/985,086, filed on Aug. 4, 2020, now Pat. No. 11,694,545.

(51) Int. Cl.
*G08G 1/01* (2006.01)
*G06N 3/04* (2023.01)
(Continued)

(52) U.S. Cl.
CPC ........... *G08G 1/0145* (2013.01); *G06N 3/04* (2013.01); *G08G 1/0116* (2013.01);
(Continued)

(58) Field of Classification Search
None
See application file for complete search history.

(56) References Cited

U.S. PATENT DOCUMENTS

| | | | |
|---|---|---|---|
| 2016/0027300 A1* | 1/2016 | Raamot | G08G 1/0145 340/922 |
| 2020/0108806 A1* | 4/2020 | Ben Shalom | B60T 7/22 |
| 2022/0009491 A1* | 1/2022 | Taruoka | B60W 30/18154 |

FOREIGN PATENT DOCUMENTS

JP        2015166974 A   *   9/2015

OTHER PUBLICATIONS

Tang-Hsien Chang, Shang-Min Yu, Yao-Jan Wu, "Dilemma zone avoidance development: An on-board approach", Mar. 2013, IET Intelligent Transport Systems 7(1):87-94 DOI:10.1049/iet-its.2011.0066. (Year: 2013).*

(Continued)

*Primary Examiner* — Adam D Tissot
*Assistant Examiner* — Charles Pall
(74) *Attorney, Agent, or Firm* — Piroozi-IP, LLC

(57) ABSTRACT

A system to reduce probability of a crash in an intersection is disclosed which includes one or more way-sensor systems, the one or more sensor systems adapted to provide position and velocity vector of an object approaching the intersection on an associated path, a processing unit including configured to: determine timing of the object with respect to a predefined zone of the intersection on the associated path, determine the current and future status of the associated traffic lights on the associated path of the object, predict timing of the object with respect to the predefined zone and future status of the associated traffic light, if timing prediction is within a predetermined threshold, modify the current status, wherein $t_{green}$ is extended, if timing prediction is outside of the predetermined threshold, modify the current status, wherein $t_{green}$ is reduced, and repeating above steps until the object has cleared the intersection.

20 Claims, 15 Drawing Sheets

(51) Int. Cl.
*G08G 1/08* (2006.01)
*G08G 1/16* (2006.01)

(52) U.S. Cl.
CPC ............. *G08G 1/0129* (2013.01); *G08G 1/08* (2013.01); *G08G 1/164* (2013.01)

(56) References Cited

OTHER PUBLICATIONS

Z.Li, et al. "Modeling Reservation-Based Autonomous Intersection Control in VISSIM", Transp. Res.Board, vol. 2381,pp. 81-90, Dec. 2013. (Year: 2013).*
Gang-Len Chang, "Design and Evaluation of an Intelligent Dilemma-Zone Protection System for a High-Speed Rural Intersection" Dec. 2013, Transportation Research Record Journal of the Transportation Research Board 2356(-1):1-8 DOI:10.3141/2356-01. (Year: 2013).*

\* cited by examiner

SYSTEM AND METHOD FOR DILEMMA ZONE MITIGATION AT SIGNALIZED INTERSECTIONS

CROSS-REFERENCE TO RELATED APPLICATIONS

The present patent application is a continuation of U.S. Non-Provisional patent application Ser. No. 16/985,086 filed Aug. 4, 2020, the contents of which are hereby incorporated by reference in its entirety into the present disclosure.

STATEMENT REGARDING GOVERNMENT FUNDING

None.

TECHNICAL FIELD

The present disclosure generally relates to traffic control systems, and in particular, to a system for dilemma zone mitigation at a signalized intersection.

BACKGROUND

This section introduces aspects that may help facilitate a better understanding of the disclosure. Accordingly, these statements are to be read in this light and are not to be understood as admissions about what is or is not prior art.

According to the Federal Highway Administration (FHWA), signalized intersection fatalities account for approximately 27% of all total traffic fatalities. Of those, about 31% involve heavy vehicles, e.g., semitrucks. In 2018 in Indiana, the rate of fatal crashes involving heavy vehicles at signalized intersections is nearly five times higher than crashes that do not involve a heavy vehicle. Previous studies have found that for red light violations, heavy vehicles entered the intersection later than passenger vehicles after the end of the yellow, and were twice as likely to violate the red light than passenger vehicles. They also require substantially longer stopping distance compared to passenger vehicles due to air brake lag and braking performance differences between passenger vehicles and heavy vehicles.

The stop-or-go decision is made at the onset of the signal turning yellow. A dilemma zone is a span of road upstream from an intersection where a vehicle can neither stop safely within the mechanical limits of the vehicle nor clear the intersection at the present speed of the vehicle at the onset of conflicting green. The dilemma zone is a span of road some distance away from the intersection which is denoted as $X_{dz}$. $X_{dz}$ is mathematically equal to the difference between a successful minimum stopping distance under maximum amount of deceleration (i.e., the minimum distance away from the intersection that once maximum deceleration rate is applied, the vehicle will successfully come to a stop prior to reaching the intersection) and a successful maximum "go-able" distance (i.e., setback from the stop line) under maximum acceleration within the applicable speed limit that ensures the vehicle can exit the intersection prior to the onset of conflicting green. Once a vehicle enters the dilemma zone, with today's technologies it becomes quite challenging to predict or even assist in avoiding an accident. Past studies have found increasing the yellow time to be effective for mitigating the number of red-light violations. However, drivers tend to adapt to increased yellow times resulting in lower probabilities of stopping. Different dilemma zone boundaries for heavy vehicles and passenger vehicles would also require reconciling yellow timing objectives for balancing efficiency and safety.

In isolated, fully-actuated high-speed rural intersections, another solution is to use green extension. Studies have found that approaches with green extension systems reduced the number of red-light violations, hard braking or other evasive actions. While green extensions are not visually detectable by the driver, one study found that drivers were less likely to stop due to adapted expectation compared to fixed-time systems. Since the benefit of green extension comes mainly from reducing the exposure of vehicles to the onset of yellow, when there is conflicting demand and the maximum green time has been reached (max out), the phase must inevitably terminate and any safety benefits are negated. Furthermore, as the time to max out approaches, the dilemma zone protection boundary decreases. Studies in the prior art have implemented an approach to reduce max outs by selectively turning off detection in anticipation of future demand to reduce the number of green extensions. However, in each of these cases, any attempt to address the challenge of vehicles entering the dilemma zone is reactive and not proactive as they do not consider or modify the trajectory and position of a vehicle or traffic signal timing before a vehicle enters the dilemma zone.

Therefore, there is an unmet need for a novel approach to manage intersection traffic particularly with respect to the dilemma zone in a proactive and dynamic manner.

SUMMARY

A system to reduce probability of a crash in an intersection is disclosed. The system includes one or more way-sensor systems associated with an intersection having traffic lights associated with each path through the intersection, the one or more sensor systems adapted to provide position and velocity vector of an object approaching the intersection on an associated path. The system further includes a processing unit. The processing unit includes a memory subsystem including a non-transitory computer readable medium, and a computing subsystem including a processor. The processor is configured to implement a deterministic method of reducing probability of crash in an intersection. In particular, the processor is configured to: A) determine position of the object with respect to a predefined zone of the intersection on the associated path, B) determine the current and future status of the associated traffic lights on the associated path of the object, C) predict position of the object with respect to the predefined zone and future status of the associated traffic light; D) if position prediction is within a predetermined threshold, modify the current status of the associated traffic light based on green extension, wherein $t_{green}$ is extended to $t_{green}+\Delta_1 t_g$, E) if position prediction is outside of the predetermined threshold, modify the current status of the associated traffic light based on early yellow, wherein $t_{green}$ is reduced to $t_{green}-\Delta_2 t_g$, and repeating steps A)-E) until the object has cleared the intersection.

A method of reducing probability of a crash in an intersection is also disclosed. The method includes receiving data from one or more sensor systems associated with an intersection having traffic lights associated with each path through the intersection, the one or more sensor systems adapted to provide position and velocity vector of an object approaching the intersection on an associated path. The method further includes a processor A) determining position of the object with respect to a predefined zone of the intersection on the associated path, B) determining the current and future status of the associated traffic lights on the associated path of the object, C) predicting position of the object with respect to the predefined zone and future status of the associated traffic light, D) if position prediction is within a predetermined threshold, modifying the current status of the associated traffic light based on green extension, wherein $t_{green}$ is extended to $t_{green}+\Delta_1 t_g$, E) if position prediction is outside of the predetermined threshold, modifying the current status of the associated traffic light based on early yellow, wherein $t_{green}$ is reduced to $t_{green}-\Delta_2 t_g$; and F) repeating steps A)-E) until the object has cleared the intersection.

BRIEF DESCRIPTION OF DRAWINGS

FIG. 2c: 6 ft radius; FIG. 2d: 9 ft radius; and FIG. 2e: 12 foot radius).

FIG. 8 is a schematic of a computer system that can interface with the system of FIG. 1a.

DETAILED DESCRIPTION

Figure 1A:
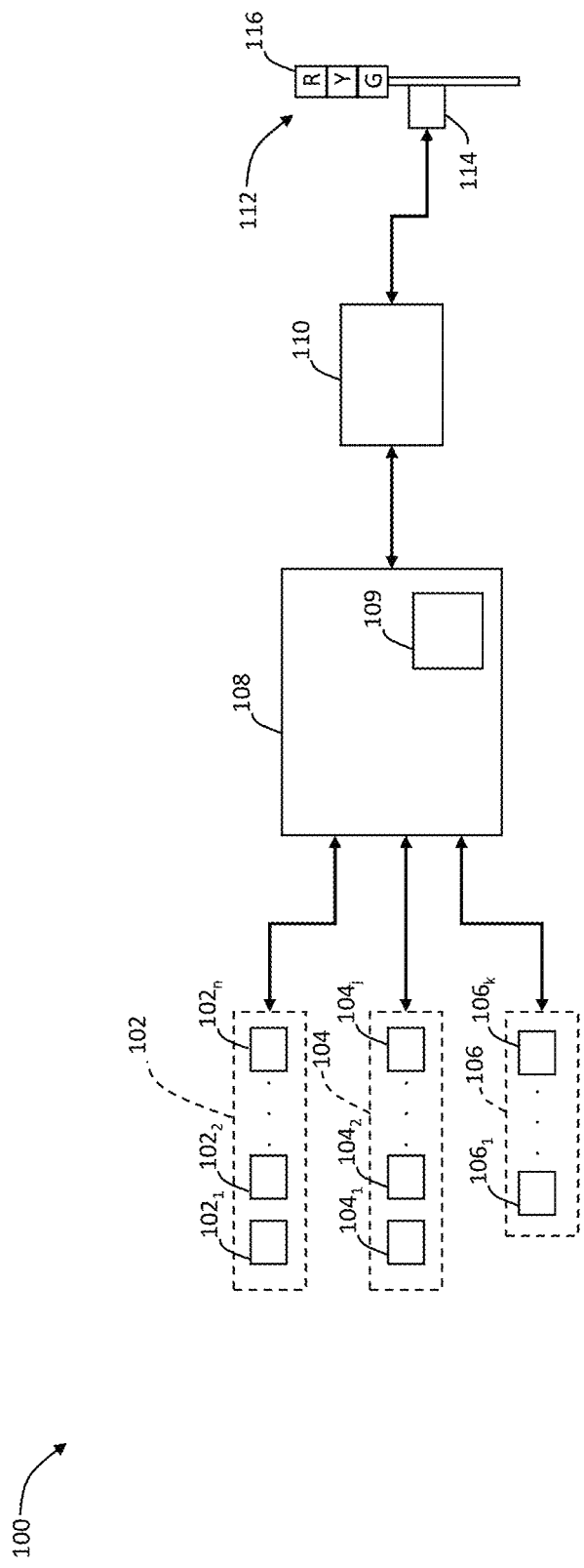
FIG. 1a is a schematic of a traffic control system for an intersection according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach to manage intersection traffic particularly with respect to a vehicle entering the dilemma zone in a proactive and adaptive manner is disclosed herein. Towards this end, extending vehicular detection further upstream of an intersection is an important aspect of the present disclosure for reductions in dilemma zone incursions by employing an dynamic system that operates with sensors, cameras, radar-based and/or wide-area detectors while simultaneously improving efficiency at intersections.

Referring to FIG. 1a, a traffic control system 100 for an intersection according to the present disclosure is shown. The system 100 includes several components each discussed separately. At the center of the system 100 is a processor 108, further described in relationship with FIG. 8. The system includes vehicle data connectivity, collectively shown as block 102. The block 102 includes vehicle nodes $102_1$, $102_2$, ... and $102_n$. The vehicles communicate with the processor 108 via connected vehicle technology discussed below. Information passed on from vehicle node $102_i$ (where the index i is intended to be any of the indexes 1, 2, ... n) includes speed of the vehicle, position of the vehicle based on GPS coordinates, gross vehicle weight of the vehicle, an encoded vehicle history and classification including mechanical qualities such as braking performance, engine performance, maintenance history, etc., as part of enhanced vehicle data that are becoming available for advantageously affecting control. The data communicated from these vehicle nodes $102_i$ is continuously updated.

Included in the system 100 is also waypoints 104. Waypoints 104 include a set of waypoints $104_1$, $104_2$, ... $104_j$. A waypoint $104_i$ can take many forms. For example, a waypoint may be simply a marker that is used with a camera system (not shown) operating from a fixed location in order to match a vehicle's position to a position in proximity to the intersection. Otherwise, a waypoint $104_i$ may be a sensor that provides a signal when a vehicle passes or comes within proximity of it, to thereby provide a match between the vehicle's position and the waypoint. In addition, a waypoint $104_i$ can be a virtual waypoint. In that sense, there are no physical embodiments, but rather virtual positions near the intersection. Towards that end, vehicular positions broadcasted from each vehicle node $102_i$ is matched to these virtual waypoints $104_i$ in order to determine the relative position of each vehicle node $102_i$ to the intersection.

Additionally, in the system 100 is also a set of sensors 106. These sensors include $106_1$ ... $106_k$. Sensors 106 can be loop detectors, discussed below comprising an electromagnetic sensor that generate a signal for the processor 108 when an object (e.g., a vehicle) passes over the sensor, or ambient sensors providing road conditions, e.g., whether the road is wet, icy, slope of the roadway (i.e., uphill, downhill or flat), magnetometers, radar, infrared. Each of the above (vehicle nodes 102, waypoints 104 and sensors represent a communication link to the processor 108 which is used to i) determine vehicular traffic approaching an intersection; and ii) match and map position of each vehicle with respect to the intersection.

Figure 1B:
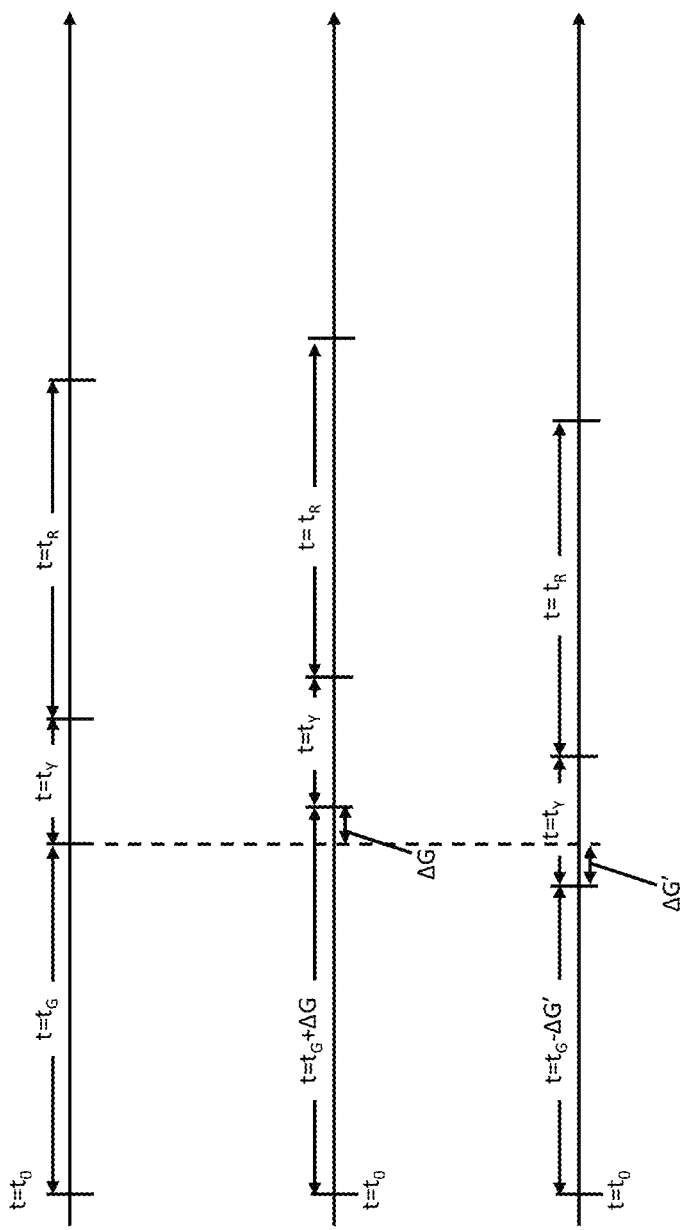
FIG. 1b is a timing diagram of a traffic light and modification of green light time, according to the present disclosure.

The processor 108 communicates with a traffic light controller 110 in order to control the traffic light 112. In one embodiment, processor 108 and traffic light controller 110 are the same unit. The traffic light 112 includes an actuation circuit 114 (also known as load switches) which controls the light 116. The light 116 includes green, yellow, and red. There are several modes for activating the traffic light 112. The first mode is a purely fixed-timed uncoordinated mode, where the traffic lights operate on the basis of a timing sequence without any concerns for live traffic patterns. In this mode, traffic in the main thoroughfare vs. traffic in the crossroads do not affect the timing of the traffic light. This mode is useful in settings where vehicle sensor installation and maintenance costs are prohibitive. The second is the fixed-time coordinated mode, where a plurality of lights are sequenced in order to provide sequential green lights for a plurality of intersections. In this mode, the beginning and end of green time are set to ensure vehicles arrive at the most optimum window, i.e. on green, from adjacent intersections, however, traffic on both the thoroughfare vs. traffic in the crossroads do not affect the green light duration based on live traffic patterns. The third mode is actuated-uncoordinated mode, where the traffic light 112 changes based on live traffic patterns, e.g., vehicles approaching the intersection, however, there is a minimum and maximum green for each direction, i.e., the traffic light at each direction can stay green only within a pre-defined, limited duration when there are vehicles at other directions competing for green time. The fourth mode is actuated-coordinated mode, where the traffic light 112 changes based on live traffic patterns, e.g. vehicles approaching the intersection, however the green time for each direction is subject to expire, i.e. force-off, based on a timer to ensure vehicles arrive at the most optimum window, i.e. on green, from adjacent intersections. An example timing of green light, yellow light, and red light is shown in FIG. 1B, which is a timing chart showing timing relationship between the three green, yellow, and red light at the intersection for the first mode (fixed-time uncoordinated mode). In FIG. 1B, a cycle begins at $t=t_0$ at which point the green light at the intersection, e.g., for the major movement lanes, is activated. The duration of the green light is shown as $t=t_G$. At the termination of the green period (i.e., at $t=t_G$), the green light is deactivated and the yellow light is turned on and it remain on for $t=t_Y$. At the termination of the yellow period (i.e., at $t=t_G+t_Y$), the light turns red and remains red for $t=t_R$.

Referring back to FIG. 1a, the processor 108 receives information about a vehicle $102_i$ approaching the intersection. Suppose the vehicle is a heavy vehicle, e.g., a semi-truck. The processor 108 receives information such as the vehicle weight, speed of the vehicle (or alternatively, calculates the speed of the vehicle based on when the vehicle is passing by waypoints), road conditions, temperature, vehicle identification number, and other relevant information about the vehicle $102_i$. The processor then calculates whether the vehicle can successfully stop prior to reaching the intersection based on the planned termination of the green light (see FIG. 1B, $t=t_G$). If the processor 108 determines that the planned termination of the green light (i.e., $t=t_G$) is insufficient for a successful stop whereby the vehicle would be caught in a dilemma zone scenario, then the processor 108 operates the traffic light in the third actuated-uncoordinated mode. If the green light duration for the direction is within the pre-defined maximum, the processor provides a signal to the traffic light controller 110 to extend the green. This green extension $\Delta G$ is seen in FIG. 1B. Instead of the green cycle terminating at $t=t_G$, the green period terminates at $t_G+\Delta G$. This allows the vehicle to safely pass through the intersection. If the green light duration can no longer be extended due to the anticipated reaching of the pre-defined maximum, i.e. force-off, the green time is thereby reduced by $\Delta G'$ to allow the vehicle to safely come to a stop outside of the dilemma zone. The green period thus terminates at $t_G-\Delta G'$. The calculations performed by the processor may be exceedingly sophisticated by obtaining service records from the vehicle $102_i$, taking into account road conditions, and a variety of information.

According to one embodiment of the present disclosure, the communication between the vehicle $102_i$ and the processor is a two-way communication. In this mode, the processor 108 not only controls the traffic light controller 110 (e.g., by providing a green extension), the processor 108 also communicates with the vehicle $102_i$ and request the vehicle to i) maintain speed, ii) increase speed at a defined acceleration, or iii) decrease speed at defined deceleration. Accordingly, augmentation to the traffic light is in concert with the requested change in acceleration/deceleration. This mode is particularly useful but not limited for autonomous or driver-less vehicles. For example, the requested increased acceleration is based on accessing lookup tables and performing calculations based on the vehicle, the weight, whether the vehicle is moving uphill/downhill or moving on level ground. The latter, i.e., the slope of the road, can have a significant impact on the ability of a vehicle to successfully stop or pass through the intersection as earth's gravity cooperates or opposes the desired acceleration/deceleration based on the slope of the roadway utilizing vector calculus. Once the acceleration and deceleration rate is calculated, and communicated to the vehicle, the processor 108 continually monitors the vehicle progress as the vehicle $102_i$ is passing by waypoints and the requested acceleration/deceleration is continually updated until the vehicle makes a successful stop or passes through the intersection. Therefore, the requested acceleration or deceleration can be based on maximum determined calculations, or based on a continually changing request in order to control the position of the vehicle $102_i$.

In FIG. 1a, within the processor 108 is also a sub-processing block 109. This sub-processing block is intended to provide a deep-learning object for the processor 108. Towards this end, the sub-processing block 109 examines how best vehicles have been able to successfully progress through the intersection. For example, in the above situation, if the processor 108 demands a specific deceleration rate from the vehicle 102', and the vehicle is unable to successfully stop prior to entering the intersection, then the sub-processing block 109 updates its deep learning model (e.g., a neural network). In this embodiment, the processor uses a weighted input from the sub-processing block 109 in order to determine a requested acceleration/deceleration rate from the vehicle $102_i$. More on the deep learning model of the sub-processing block 109 is provided below.

Connected vehicle (CV) technology using Dedicated Short Range Communications (DSRC) protocols are utilized by the system of the present disclosure to detect equipped vehicles from about 1000 ft to about 1.2 miles by a road-side unit (RSU). The Basic Safety Messages (BSMs) transmitted by the vehicles to the intersection contain latitude and longitude, speed, elevation, heading, braking information, and timestamp at 0.1 s interval. The system of the present disclosure uses map-matching of BSMs to physical or virtual waypoints in lanes upstream of a signalized intersection to determine vehicle position relative to a stop bar. If dilemma zone mitigation is necessary, phase control action using NTCIP 1202 objects is automatically initiated. National Transportation Communications for ITS Protocol (NTCIP) is the standard communication protocol for Intelligent Transportation Systems (ITS), known by a person having ordinary skill in the art, of the data transmission between the traffic control devices and ITS system. NTCIP is made up of five layers, which include Information Level, Application Level, Transport Level, Sub-network Level and Plant Level. The information level provides definitions while the application level includes information about data package and the standards by which data is communicated and managed. Other layers provide information about routing, communication protocol, and the physical layer.

Thus, the system of the present disclosure matches BSMs to virtual waypoints to provide sufficient performance for dilemma zone mitigating tactics, provides a dilemma zone mitigating tactic for CV, and evaluate the performance of the tactic using Automated Traffic Signal Performance Measures (ATSPM) data. These goals are also visited in an adaptive neural network engine to provide an adaptive solution that continually improves based on evaluation of its output vs. actual results.

Figure 1C:
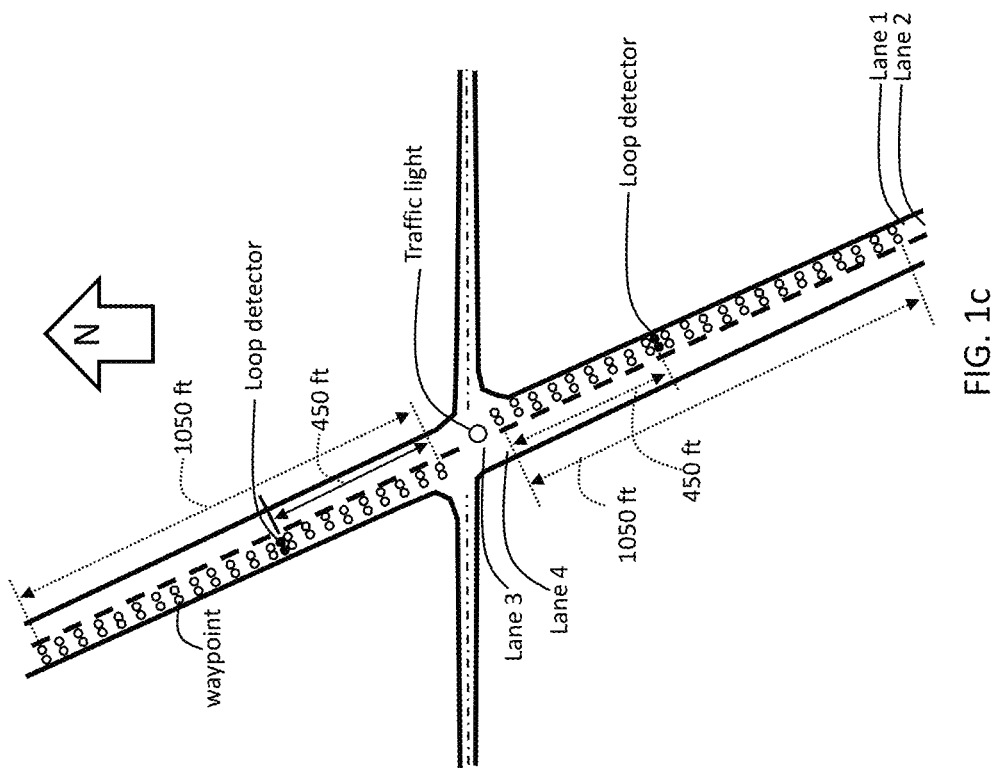
FIG. 1c is a schematic of an exemplary intersection for use with the system of the present disclosure.

A rural high-speed signalized intersection is selected for collecting data, as schematically shown in FIG. 1c. In this example highway, the mainline arterial highway has a total of four 12 ft lanes (lane 1, lane 2, lane 3, and lane 4) two of which (lane 1 and lane 2) going north-south and the other two (lane 3 and lane 4) going south-north and with a speed limit of 55 mph. Lane 1 and lane 2 are schematically separated from lane 3 and lane 4 with a dashed line. The cross-road is a county road with a total of two 12 ft lanes each of which going east-west. The lanes in the crossroad are separated by a long dashed line. The mode distribution is 26% heavy vehicles. Loop detectors (induction-based systems which operate similar to a metal detector and thus measure a change in magnetic field when a metallic object passes over the sensor wire) are located 405 ft upstream of the stop bar in both of the mainline approaches (callout i, callout ii) with a 5 s vehicle green extension time (i.e., green can be extended from the predetermined period by 5 seconds but remain below maximum green). The intersection runs fully actuated with a 60 s max time on the mainline phases.

In addition to the loop detectors, a roadside unit (RSU)—a transceiver adapted to provide vehicle to infrastructure wireless connectivity—is instrumented atop a northeast pole facing southwest and is connected to the same subnet as the traffic signal controller. Any BSM received is immediately forwarded the processor 108 (see FIG. 1) where the map-matching is performed. As an example, a series of 22 virtual waypoints with 50 ft spacing in the main through lanes are defined starting from the stop bar up to 1,050 feet (FIG. 1c).

In particular to dilemma zones, the onset of yellow time can be recorded and thus determine whether a phase termination is due to a gap out, max out, or force off at 0.1 s interval. Phase termination is the end of the green phase. For fixed-time phase termination is based on a pre-set timer. For actuated (sensor-driven) operation, there are three reasons why a phase terminates: gap out (where a gap in traffic, results in the end of a phase), max out (maximum green time has been reached in an uncoordinated/free-running intersection), force-off (time has been reached/passed the point when this movement should be green to allow for coordination, for actuated operation). Please see below for reference from FHWA's signal timing manual. Additionally, vehicle detection data is recorded and can be compared to the phase termination time to determine whether a vehicle was in the dilemma zone at the onset of yellow.

A vehicle instrumented with a CV technology onboard unit (OBU) is used for sending BSMs to the RSU. The RSU forwards received packets above a threshold of −82 dbm to the embedded co-processor unit installed within the traffic signal controller. A set of virtual waypoints containing latitude, longitude, a range of acceptable heading, and associated lane and phase information is preloaded on the co-processor system, where an application persistently listens for new BSMs. Each received packet within the acceptable strength threshold is decoded and matched to the set of virtual waypoints. If the vehicle sending the BSM is in proximity of a waypoint within the range of acceptable heading, a call is placed via NTCIP for the associated phase. All BSMs, successful waypoint matches, and phase calls are logged locally on the co-processor system.

Figure 2A:
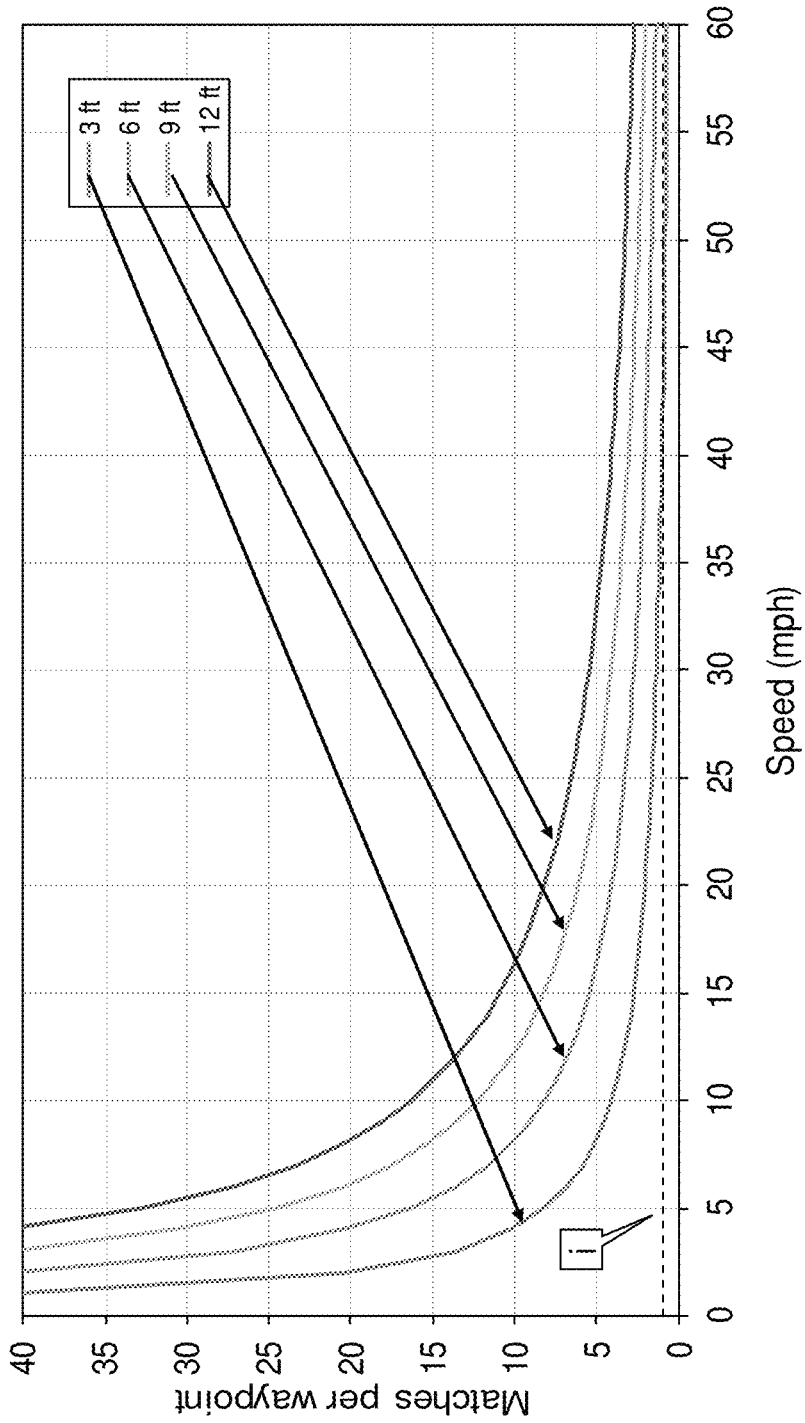
FIG. 2a is a graph of matches per waypoint vs. speed in miles per hour which illustrates a series of radii (3 ft, 6, ft, 9 ft, and 12 ft) and number of matches depending on a vehicle's speed.

A radius is the maximum distance from each waypoint that a vehicle can be matched. Referring to FIG. 2a, a graph of matches per waypoint vs. speed in miles per hour is provided which illustrates a series of radii (3 ft, 6, ft, 9 ft, and 12 ft) and number of matches depending on a vehicle's speed. With a transmit interval of 0.1 s, a vehicle travelling at 55 mph (80.7 fps) is not guaranteed to match a waypoint with a 3 ft radius threshold (callout i in the graph), assuming the vehicle's trajectory, OBU antenna, and waypoint are all reasonably centered in the lane.

Figure 2C:
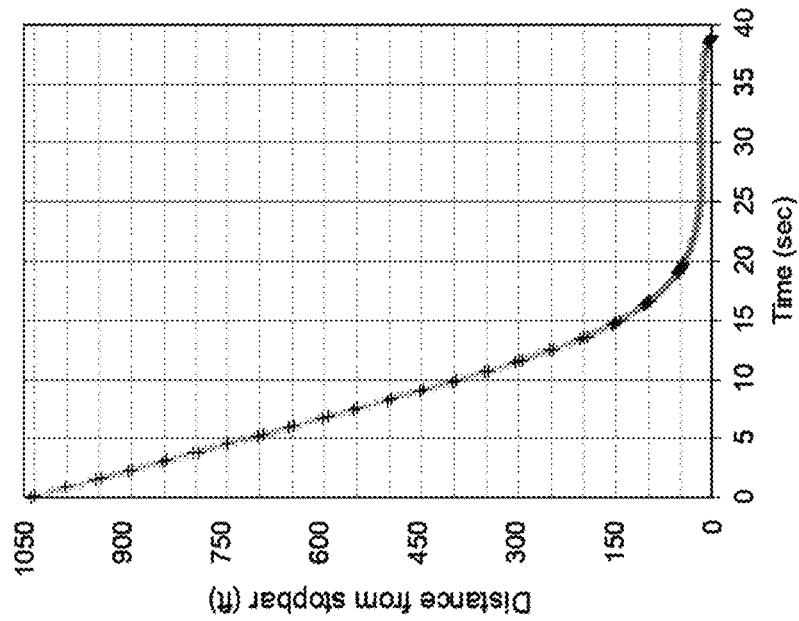
FIGS. 2b-2e are graphs of distance from stopbar in feet vs. time in seconds for trial runs at about 45 mph (excluding stopping for red) for each of the radii listed in FIG. 2a for 50 ft spacings (FIG. 2b: 3 ft radius.
Figure 2B:
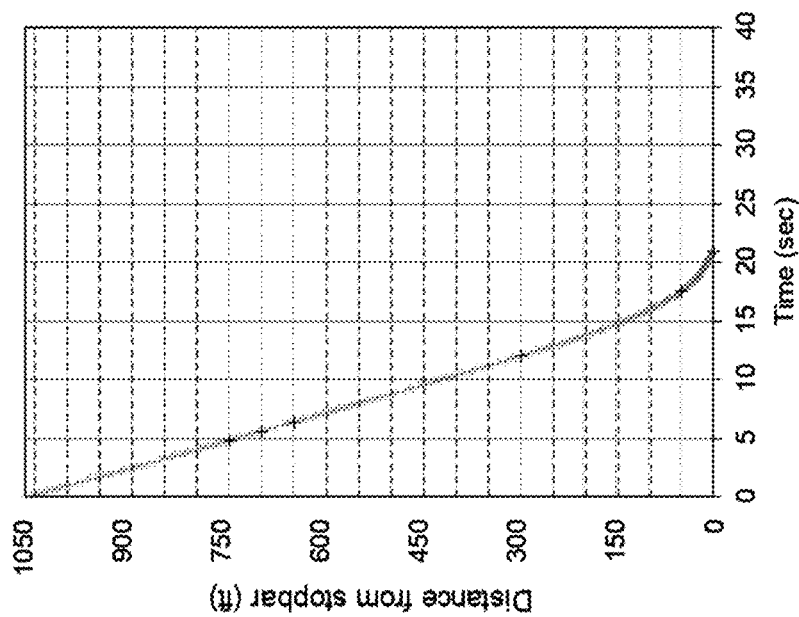
Figure 2E:
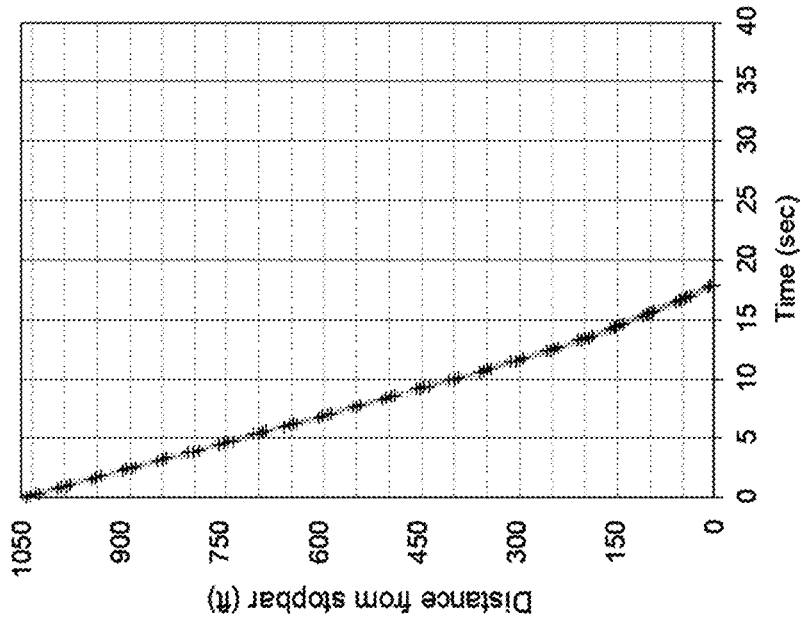
Figure 2D:
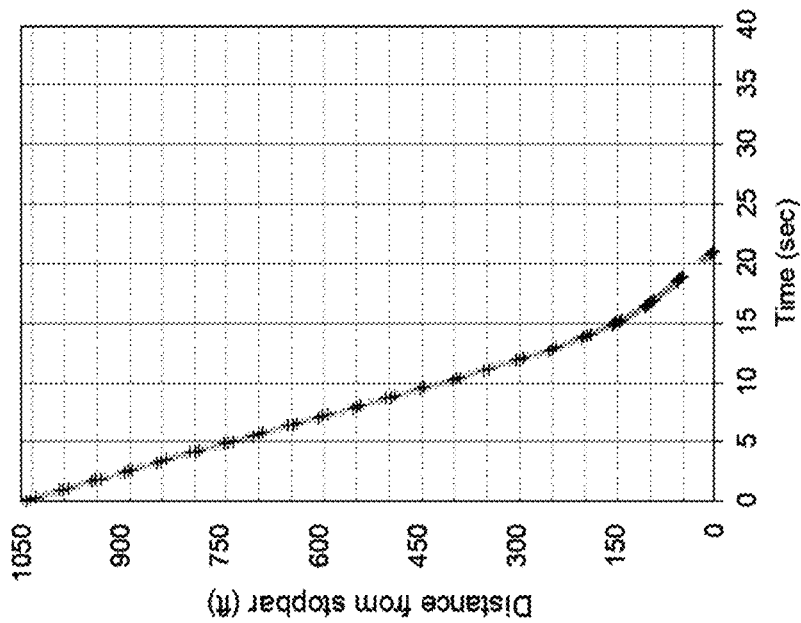

Referring to FIGS. 2b-2e, graphs of distance from stopbar in feet vs. time in seconds are provided for trial runs at about 45 mph (excluding stopping for red) for each of the radii listed in FIG. 2a for 50 ft spacings (FIG. 2b: 3 ft radius; FIG. 2c: 6 ft radius; FIG. 2d: 9 ft radius; and FIG. 2e: 12 foot radius). Out of the 22 waypoints, a 3 ft radius threshold resulted in 16 out of the 22 waypoints missed (see FIG. 2b, dotted lines), while radii 6 ft and greater had no missed waypoints (dark crosses). The larger radii of 9 ft and 12 ft yielded more matches per waypoint, but risk encroachment into adjacent lanes. If more than one waypoint was matched, the waypoint closest to the vehicle was selected, which performed well to exclude adjacent lanes. For this study, a 6 ft radius threshold is used which covers one lane width at the study location.

Figure 3A:
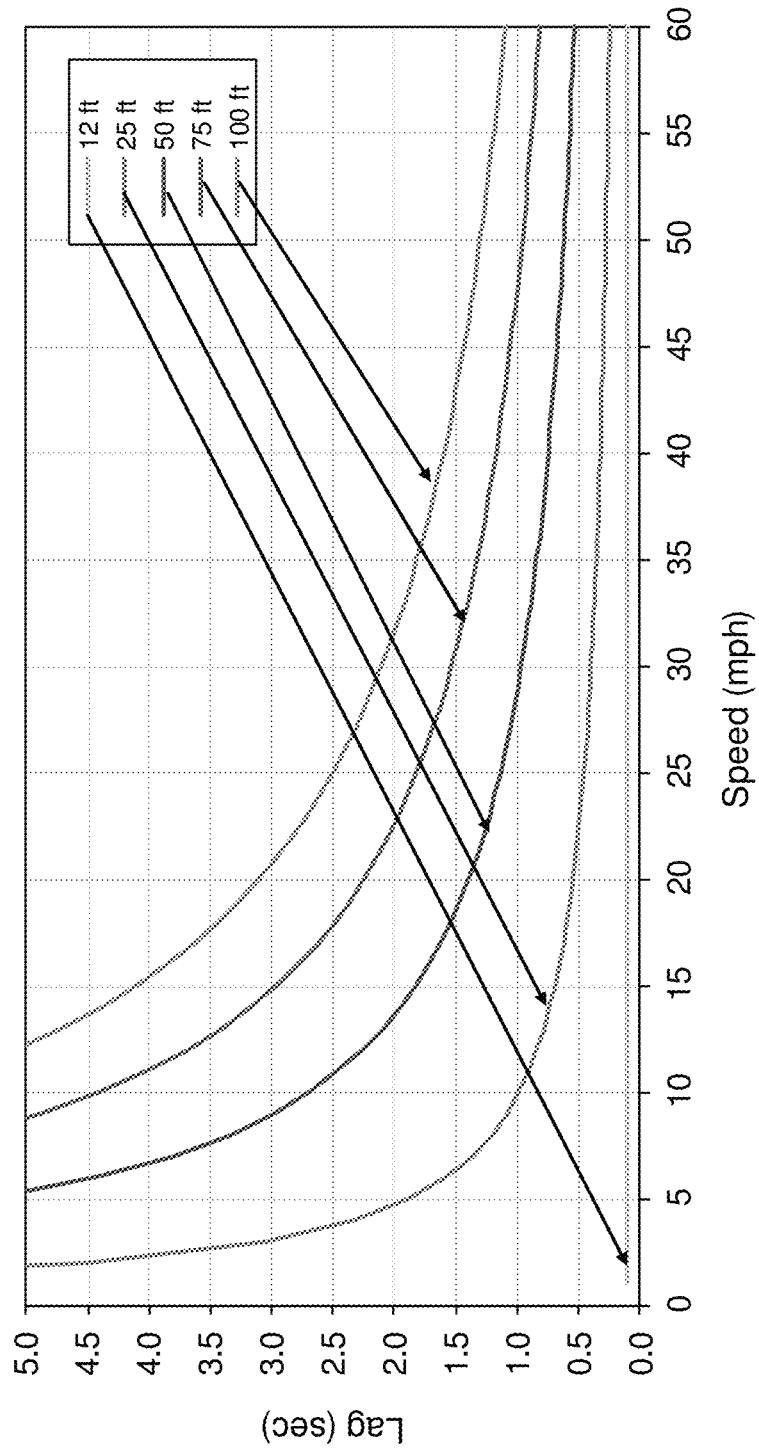
FIG. 3a is a graph of lag in seconds vs. speed in miles per hour for different waypoint spacing which illustrates the time lag for a pair of waypoints with a 6 ft radius for a series of spacings.

The following procedure was used to determined waypoint spacing. The spacing is the distance between the centers of two consecutive waypoints. As the spacing increases, the lag between matches also increases because the vehicle needs to "traverse the gap." FIG. 3a is a graph of lag in seconds vs. speed in miles per hour for different waypoint spacing which illustrates the time lag for a pair of waypoints with a 6 ft radius for a series of spacings. For a 12 ft spacing, every BSM would be matched assuming vehicle and waypoints are both centered in the lane, thus the lag is constantly 0.1 s. The tradeoff for densely populating waypoints is that the size of the communication message will substantially increase, and may cause capacity challenges under load. The lag stays below 1.0 s for spacings of 75 ft, 50 ft, and 25 ft. However, for 100 ft spacing the lag is above 1.0 s.

Figure 3B:
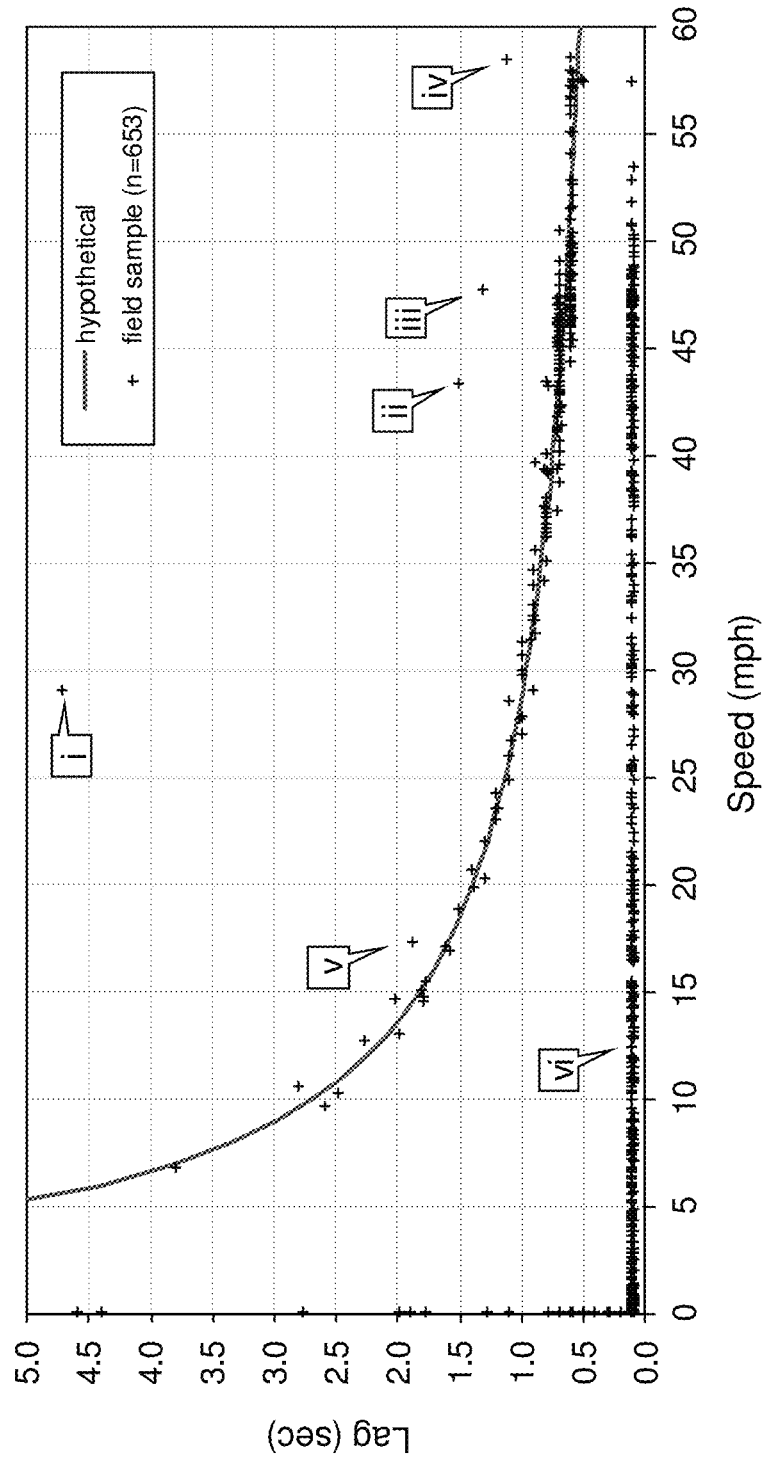
FIG. 3b is another graph of lag measured in seconds vs. speed measured in miles per hour which illustrates hypothetical lag curve vs. collected field samples.

To evaluate the performance of waypoint spacing using 6 ft radius, 50 ft spacing is used which gives an estimated lag time of 0.59 s between matches at 55 mph. Referring to FIG. 3b another graph of lag measured in seconds vs. speed measured in miles per hour is shown which illustrates hypothetical lag curve vs. collected field samples, which performs reasonably close to the estimating function. Callout i is an instance where three waypoints are missed by the vehicle when the vehicle is not centered in the lane. Callout ii and callout iii are two instances where four BSM messages are dropped each, therefore missing a portion of one waypoint. Callout iv is an instance where one waypoint is missed by the vehicle completely and callout v is when the vehicle veered slightly to the edge of the lane at low speed. Callout vi shows the matches within one waypoint which has a lag equivalent to the DSRC transmission interval of 0.1 s. At faster speeds beyond 50 mph, the number of matches within one waypoint drops off. Overall 83% of the samples have lower lag than the hypothetical curve and 95% of the samples are within 5% or less.

On a valid match between a vehicle's location and a waypoint, a call is placed for an associated phase using the NTCIP phase call control object. To record only instances where the mainline phases (Ø2 and Ø6) are called by the BSM, they must be separated from the loop detector calls to the same phase. Since NTCIP does not allow calling of detector channels directly, two "dummy" phases (Ø9 and Ø11) of 0.1 s duration are created on a third and fourth timing ring that each calls a dummy detector channel. Each of the dummy detector channels then calls the true movement phase.

By default, when a phase using call control is set, the call latches for a deterministic amount of time defined by the unit backup time parameter. For this study, 1 s is set for this parameter. To prevent the dummy phases from resting, buffer phases (Ø10 and Ø12) with backup prevent and recall enabled are programmed in each ring of the dummy phases, also with a 0.1 s duration.

Using the above described phase and detector programming, the BSMs are able to extend the green on a mainline phase when they are matched with a waypoint up to 1,050 ft in advance of the stop bar as shown in FIG. 1c.

This present disclosure uses Force Gap Out (FGO) to selectively early-terminate mainline phases before a subject vehicle enters the dilemma zone. FGO is triggered when it is determined that a CV will be within dilemma zone limits at the onset of yellow.

Dilemma zone performance deteriorates steeply during peak periods due to max outs occurring when one or more vehicles are within the dilemma zone. A binary regression model is used for estimating stopping distance and time within these thresholds, defined by $$\frac{1}{1+e^{-\alpha-\beta_1 V-\beta_2 X}} \quad (1)$$

where V is the velocity, and
X is the stopping distance. The parameters for heavy vehicles are used with $\alpha=0.1$, $\beta_1=-0.1$ and $\beta_2=0.08$.
The estimated dilemma zone boundary is within 2.2 s.

Figure 4:
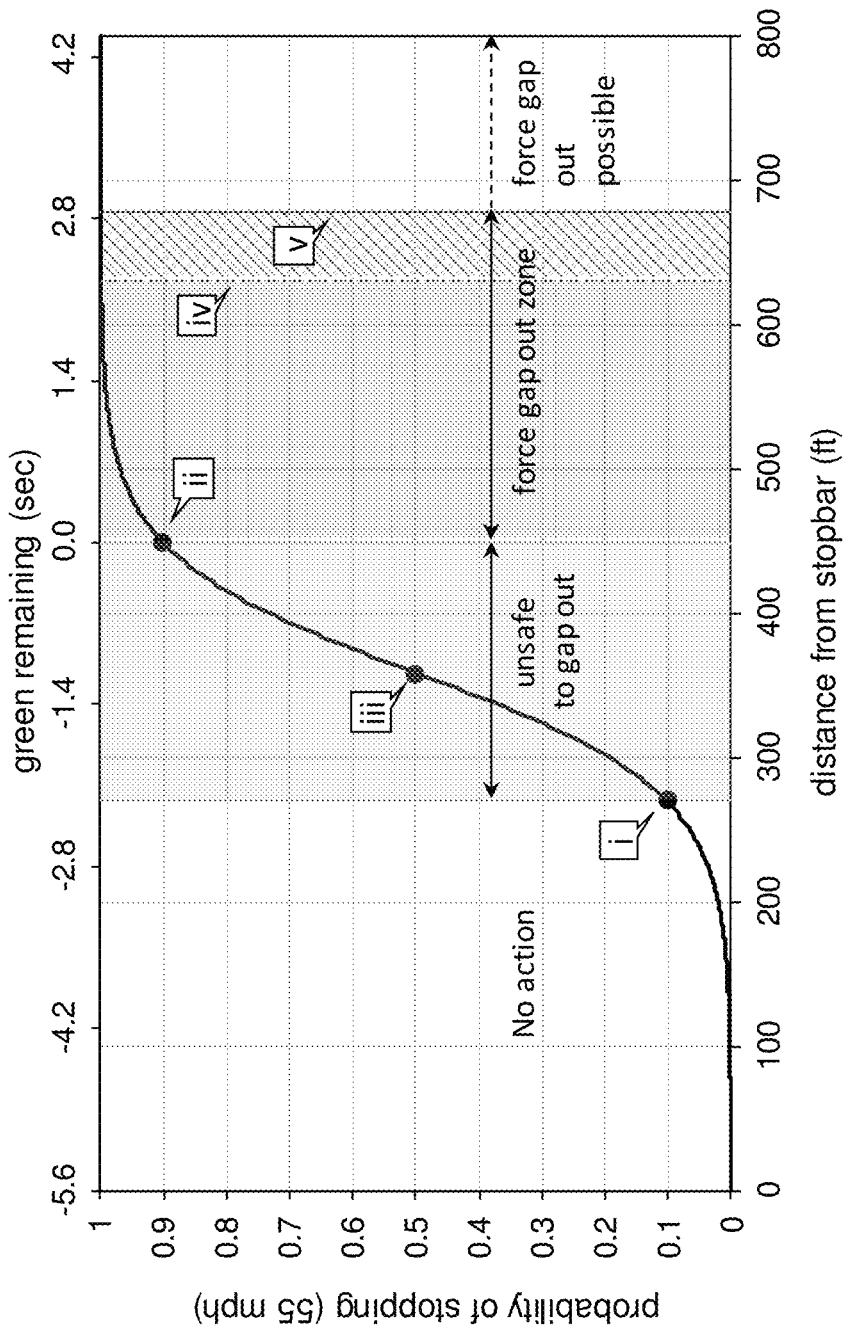
FIG. 4 is a complex graph illustrating probability of stopping for vehicles moving at 55 miles per hour plotted against distance from the stopbar in ft.

Referring to FIG. 4, a complex graph is provided illustrating probability of stopping for vehicles moving at 55 miles per hour is plotted against distance from the stopbar in ft and which illustrates the probability of stopping curve as defined by Eq. 1. Between 10% and 90% of drivers choose to stop from 269 ft to 449 ft in advance of the stop bar when the onset of yellow occurs in this boundary (callout i, callout ii). Within these limits no FGOs would be triggered. At 50% probability of stopping (callout iii), the risk of conflict is the highest due to the same number of drivers wanting to stop as wanting to proceed.

In FIG. 4, the top horizontal axis indicates the amount of green time left in the phase, and the onset of yellow is aligned to the 90% threshold, corresponding to the 449 ft mark. Any CV estimated to arrive at or after this point but before the 269 ft mark (2.2 seconds later) would trigger FGO early from 449 ft to the 629 ft mark (2.2 s earlier, callout iv). An extra 0.59 s is added to this limit (callout v) to account for any delay due to lag between waypoints defined in the previous section. Any FGO occurring in advance of this point is possible but may not be efficient.

1. In general, the FGO logic is triggered when the following conditions are met:
   There is a call on any side-street movement;
2. The max green time remaining $t_{max}$ on phase P is less than a critical threshold $\gamma_c$ (2.2 s at 55 mph);
3. Phase P is currently on;
4. Phase P is called by a CV.

Once all of the above conditions are met, an alternative detection plan is enacted immediately to gap out all mainline phases. The logic is then blocked for td seconds, set to the yellow and all-red clearance interval plus the min green of the next phase. After td seconds, the detection is reverted to the original plan.

Figure 5A:
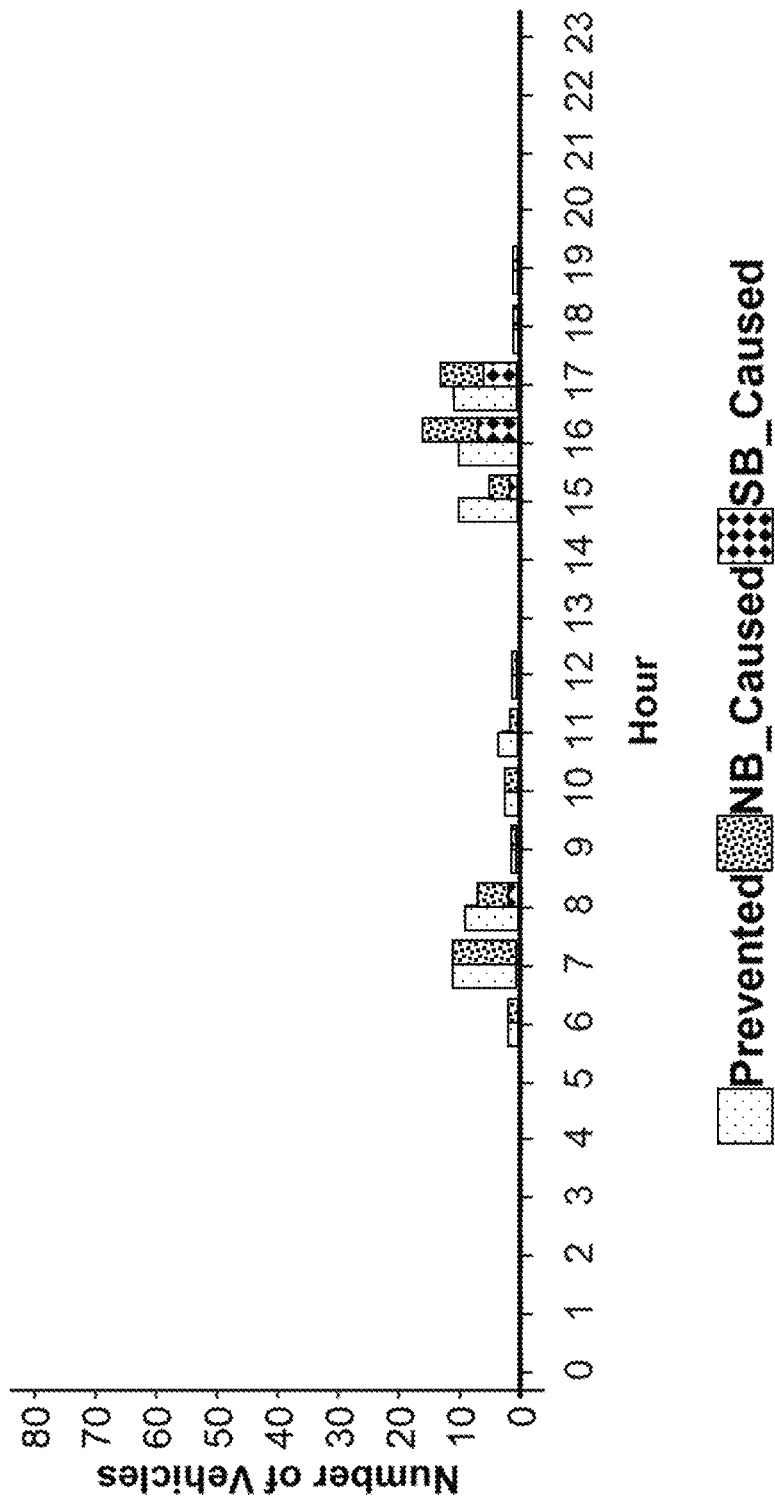
FIG. 5a is a bar graph showing number of vehicles per hour for three different categories which shows the number of Force Gap Out (FGO) estimated in the northbound direction over a 24 hour period with the number of vehicles prevented from dilemma zone incursion and the number caused in both directions.
Figure 5B:
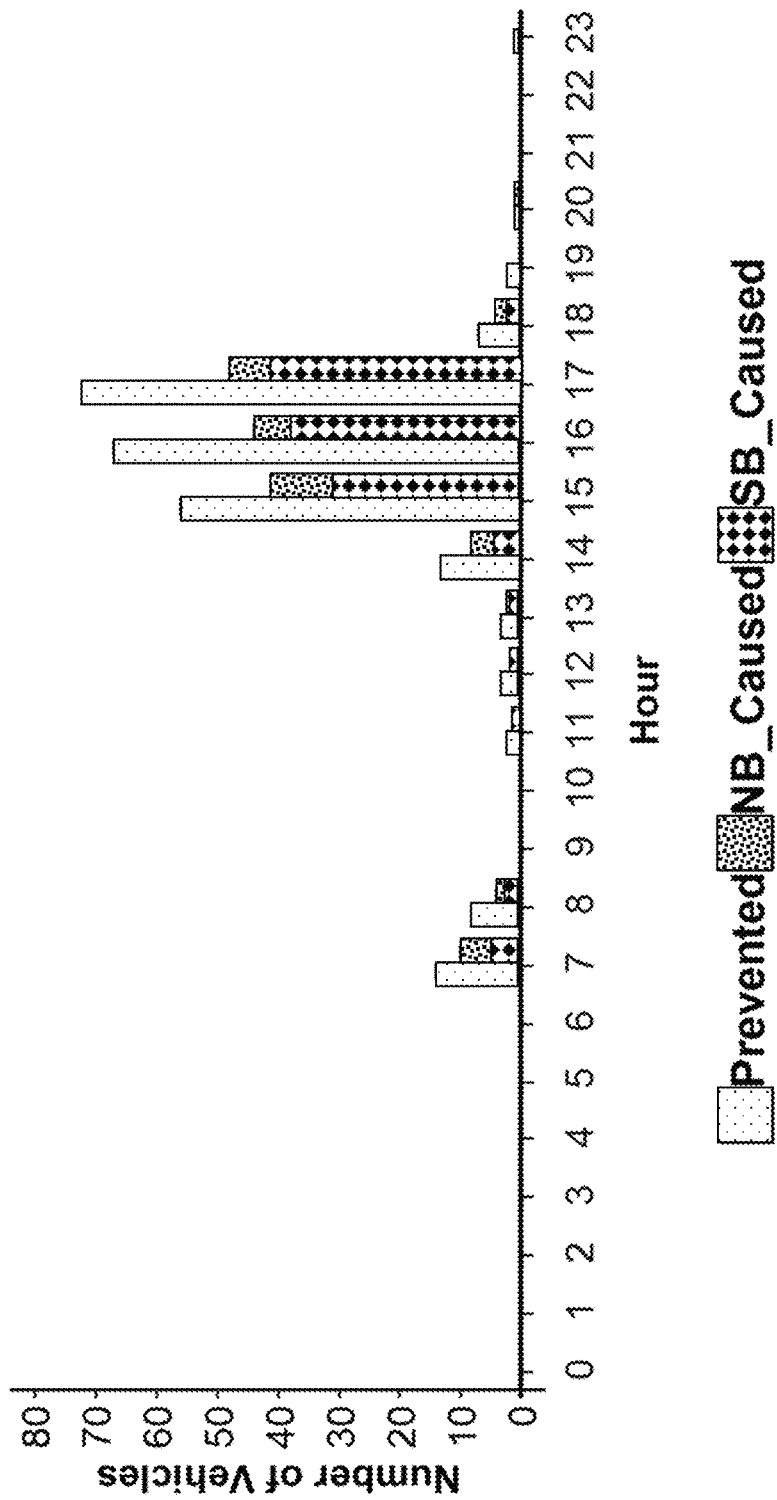
FIG. 5b is a bar graph showing number of vehicles per hour for three different categories.
Figure 5C:
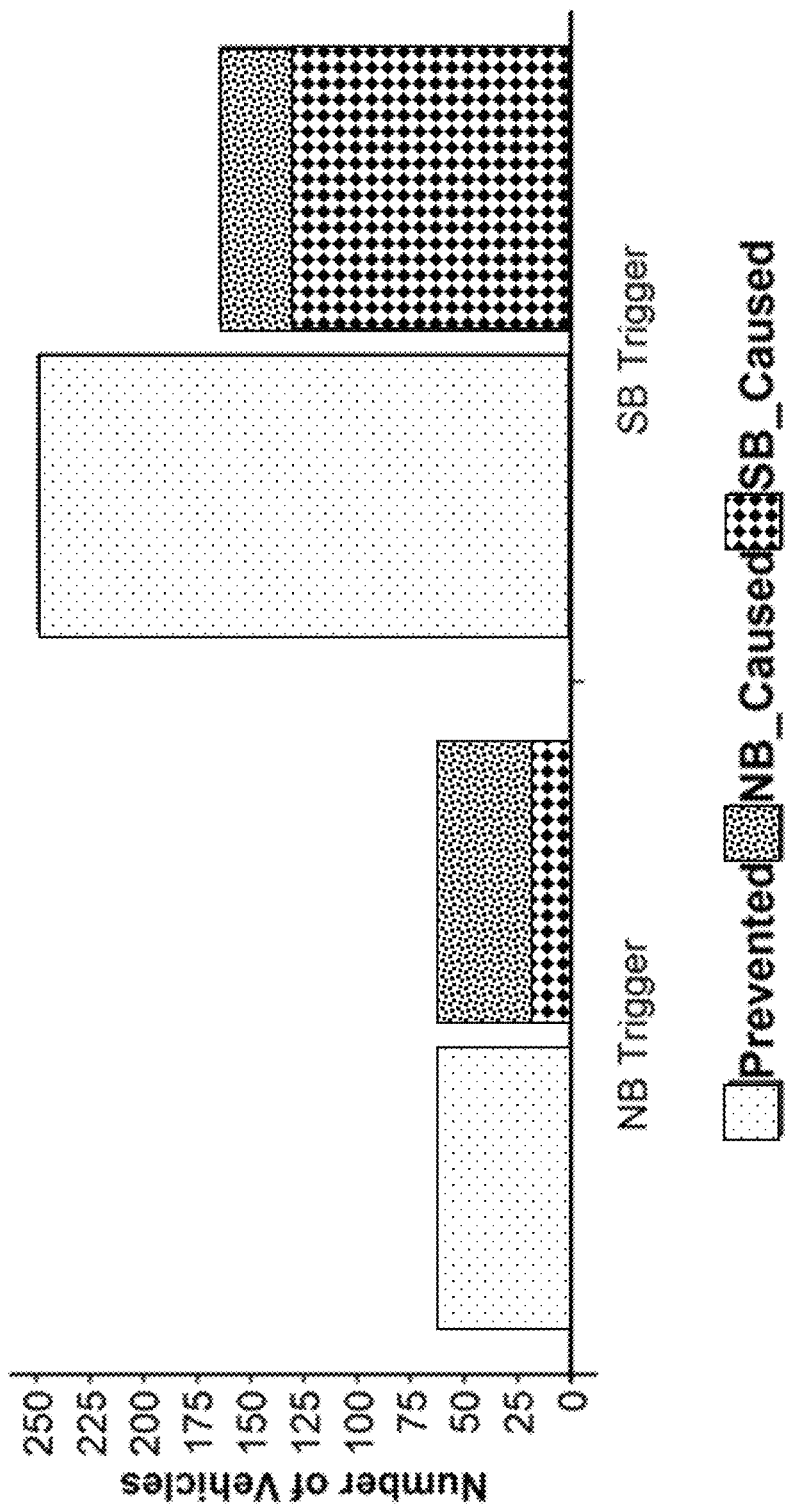
FIG. 5c is a bar graph showing number of vehicles for northbound and southbound for three different categories.

Although a CV may prevent itself from a dilemma zone incursion using FGO, it may cause other vehicles to be in the dilemma zone (where they would not have been) as an effect—likely during high volume periods. To determine if FGO reduces dilemma zone incursions overall within a period, a tradeoff estimation is made using ATSPM data. FIGS. 5a-5c illustrate the result of the estimate for the study intersection of FIG. 1c over a four month period. An FGO is considered in the estimation if a mainline phase terminated with a max out and any detection at the advance loop, interpolated to the onset of yellow time, falls within the dilemma zone limits. FIG. 5a which is a bar graph showing number of vehicles per hour for three different categories which shows the number of FGO estimated in the northbound direction over a 24 hour period with the number of vehicles prevented from dilemma zone incursion and the number caused in both directions. At the northbound approach, most hours would break even or see slightly more vehicles prevented from a dilemma zone incursion than it would have caused, with the exception of the peak times of 06:00, 08:00, 16:00, and 17:00.

The southbound direction shows a greater benefit (see FIG. 5b, which is a bar graph showing number of vehicles per hour for three different categories), as more vehicles would be prevented from a dilemma zone incursion or at least break even for all hours. Overall, there are 310 vehicles (if equipped with OBUs) estimated to trigger FGO over a four-month period, with 61 vehicles prevented in the northbound direction and 249 vehicles prevented in the southbound direction. The number of dilemma zone incursions caused by the FGOs is 173 in the northbound direction and 52 in the southbound direction for a total of 225 FGO-caused incursions. In terms of tradeoffs, the northbound direction had no change and the southbound direction has a net dilemma zone incursion reduction of 34%.

Returning back to FIG. 1a, as discussed above, the sub-processing block 109 provides a deep-learning block for the processor 108. According to one embodiment, the sub-processing block 109 is based on neural network used for producing and adjusting an array of binary logistic models to determine the probability that a moving object will stop or go for example at the onset of the yellow light.

Figure 6:
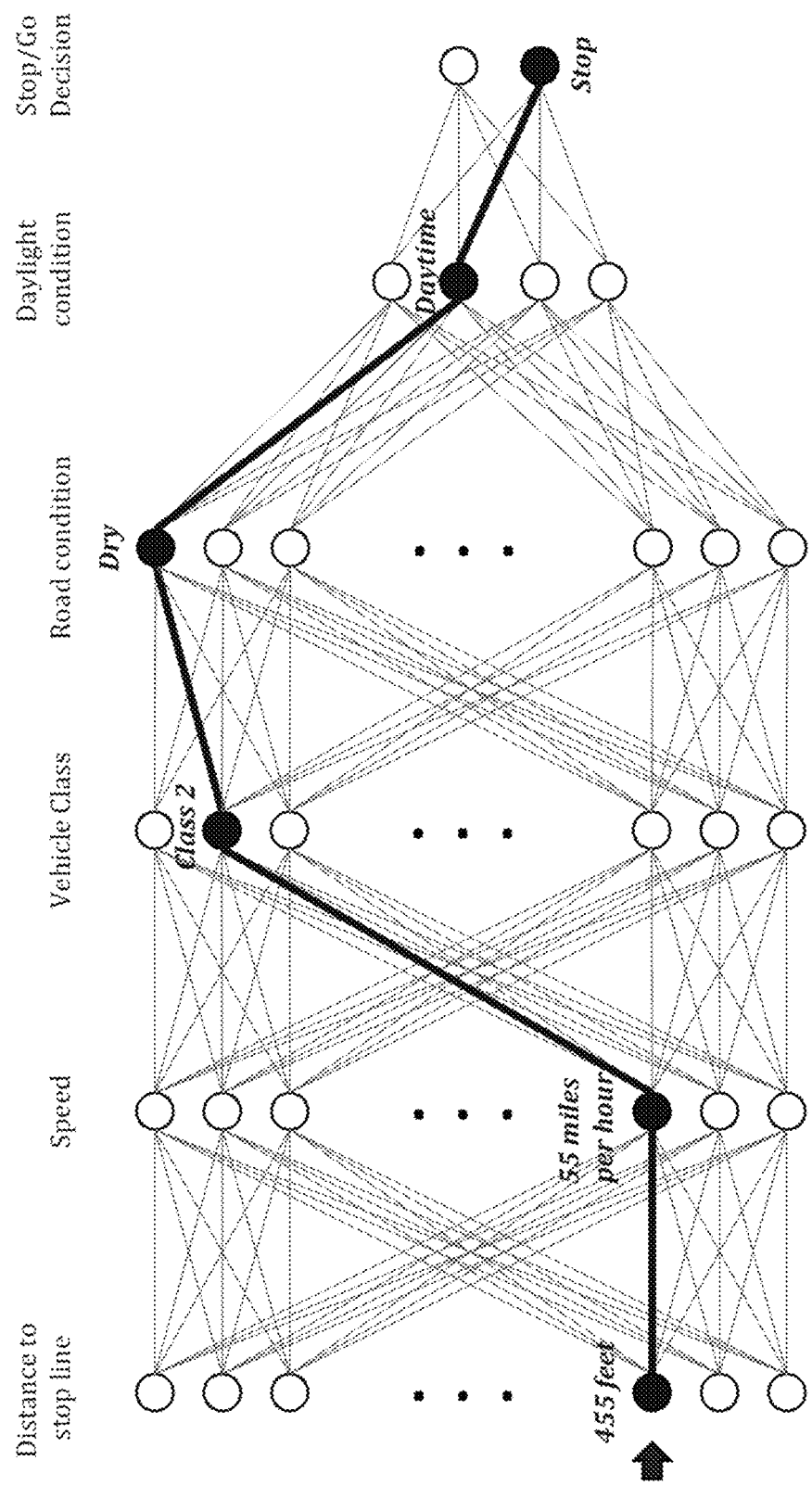
FIG. 6 is an example of a neural network provided according to the present disclosure.

Referring to FIG. 6, an example of a neural network is provided. Each layer of the neural network is defined by properties of the moving object and conditions of the setting at the onset of yellow. The properties of the moving object include, but are not limited to distance to the stop line, speed, and vehicle class. The conditions of the setting include, but are not limited to: road condition and daylight condition. Additionally, the final layer specifies whether the moving object stops or goes at the onset of yellow. FIG. 6 shows the neural network's layers, with the traversal of the network taking the path of the aforementioned properties (i.e., distance to stop line, speed, class of vehicle, road conditions, daylight conditions, etc.). For other sets of properties and conditions may take other paths in the network. Not all properties may be available, depending on what technology is instrumented or can be accessed, and availability of infrastructure and technology. Additionally, more layers may be added as technology improves to provide improved instrumentation.

Figure 7:
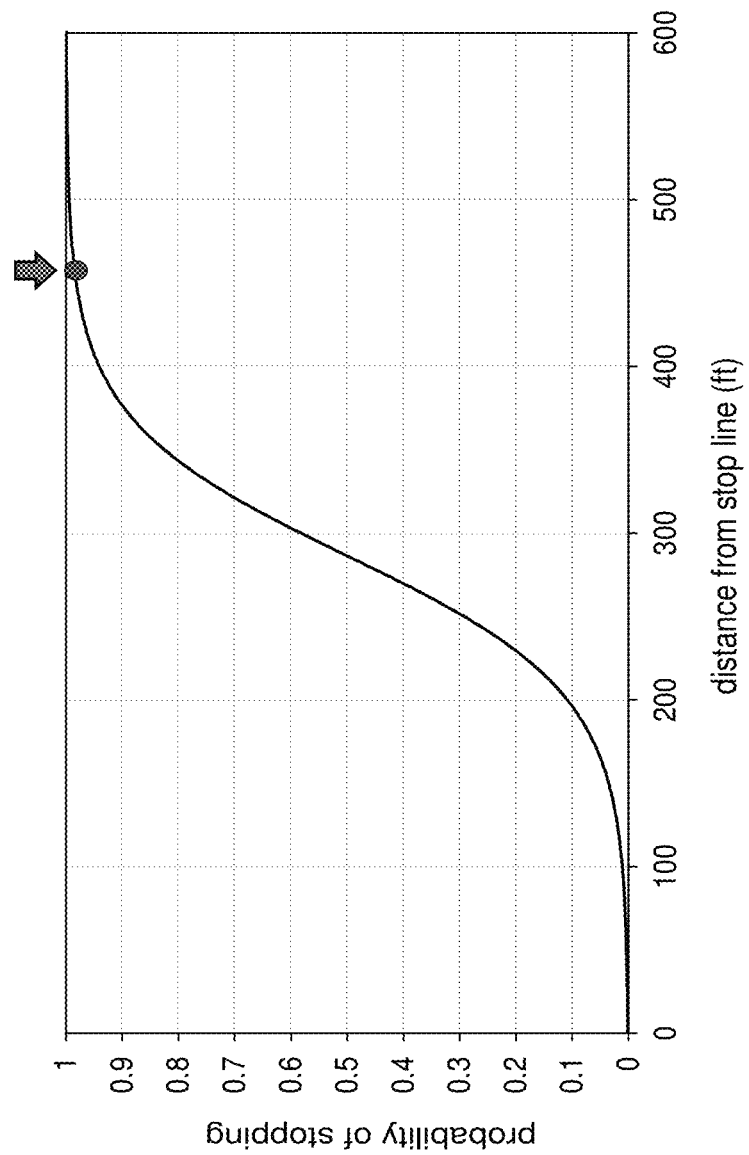
FIG. 7 is graph of probability of stopping vs. distance from stop line provided in ft.

Referring to FIG. 7, result of one binary logistic model from moving objects and conditions with the parameters of speed as 55 miles per hour, vehicle class as Class 2, and dry daylight condition are shown. FIG. 7 provides the probability of stopping vs. distance from stop line provided in ft. The arrow indicates the distance of the moving object to the stop line at the onset of yellow for the following set of parameters: distance to stop line=455 ft; speed=55 MPH, vehicle class=class 2; road conditions=dry; daylight conditions=daytime; and stop or go decision=stop.

Depending on whether the moving object stops or goes, the underlying data supporting the model is adjusted and a new model for the specific set of conditions is updated to reflect the new data input. The example shown in FIG. 7 at the blue arrow indicates there is a >95% probability a Class 2 vehicle travelling at 55 miles per hour in dry daylight conditions will stop at 455 feet upstream of the stop line at the onset of the yellow light. The model is thus updated when actual results are compared with model output.

Figure 8:
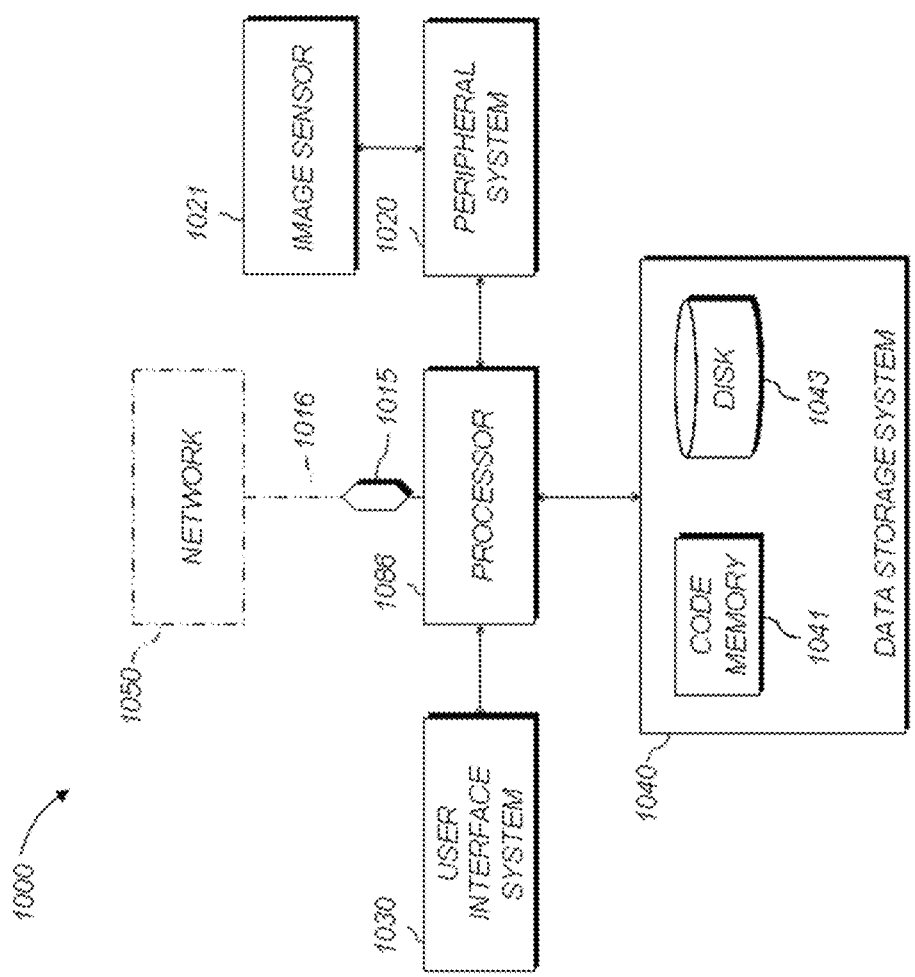

Referring to FIG. 8, an example of a computer system is provided that can interface with the above-discussed traffic control system 100 (e.g., see FIG. 1a). Referring to FIG. 8, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line or fiber optics; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those having ordinary skill in the art will recognize that numerous modifications can be made to the specific implementations described above. The implementations should not be limited to the particular limitations described. Other implementations may be possible.

The invention claimed is:

1. A system to reduce probability of a crash in an intersection, comprising:
   one or more way-sensor systems associated with an intersection having traffic lights associated with each path through the intersection, the one or more way-sensor systems adapted to provide position and velocity vector of an object approaching the intersection on an associated path;
   a processing unit including:
      a memory subsystem including a non-transitory computer readable medium, and
      a computing subsystem including a processor, the processor configured to implement a deterministic method of reducing probability of crash in an intersection, the processor configured to:
         A) determine timing of the object with respect to a predefined temporal zone of the intersection on the associated path;
         B) determine the current and future status of the associated traffic lights on the associated path of the object;
         C) predict timing of the object with respect to the predefined temporal zone and future status of the associated traffic light;
         D) if timing prediction is within a predetermined threshold, modify the current status of the associated traffic light based on green extension, wherein $t_{green}$ is extended to $t_{green}+\Delta_1 t_g$;
         E) if timing prediction is outside of the predetermined threshold, modify the current status of the associated traffic light based on early yellow, wherein $t_{green}$ is reduced to $t_{green}-\Delta_2 t_g$; and
         F) repeating steps A)-E) until the object has cleared the intersection.

2. The system of claim 1, wherein the object is one or more of a car, a truck, a heavy duty truck, a semitruck, a bicycle, a motorcycle, a scooter, a skateboard, and a pedestrian.

3. The system of claim 1, wherein the one or more way-sensor systems are proximate to the intersection, one or more cameras at or proximate to the intersection, global positioning systems coupled to the object, one or more cellular communication devices, one or more Bluetooth communication devices, one or more Wi-Fi communication devices, one or more short-range radio frequency communication devices, and a combination thereof.

4. The system of claim 1, wherein the timing prediction is calculated by extrapolating timing data based on the sensed position and velocity vectors.

5. The system of claim 1, wherein modification of the current status of the associated traffic light is based on one of a decision tree, statistical model, neural network, database function, and a combination thereof.

6. The system of claim 1, the processor further configured to communicate with a corresponding processor in the object to request maintaining velocity on the associated path until the object has passed the intersection.

7. The system of claim 6, the processor further configured to communicate with a corresponding processor in the object to change speed at a predefined rate.

8. The system of claim 7, wherein the predefined zone includes a first zone, a second zone, and a third zone in order of distance from the intersection, wherein the processor is further configured to update modification of the current status of the associated traffic light based on position and velocity vectors of the object within each of the first, second, and third zones.

9. The system of claim 1, the processor and the memory are positioned i) proximate to the intersection and/or ii) remote to the intersection in a computing cloud.

10. The system of claim 1, the processor is further configured to update the predetermined threshold using an error minimization procedure, whereby error is defined as the predicted outcome vs. measured outcome of the object timing.

11. A method of reducing probability of a crash in an intersection, comprising:
    receiving data from one or more way-sensor systems associated with an intersection having traffic lights associated with each path through the intersection, the one or more way-sensor systems adapted to provide position and velocity vector of an object approaching the intersection on an associated path;

a processor:
- A) determining timing of the object with respect to a predefined temporal zone of the intersection on the associated path;
- B) determining the current and future status of the associated traffic lights on the associated path of the object;
- C) predicting timing of the object with respect to the predefined zone and future status of the associated traffic light;
- D) if timing prediction is within a predetermined threshold, modifying the current status of the associated traffic light based on green extension, wherein $t_{green}$ is extended to $t_{green}+\Delta_1 t_g$;
- E) if timing prediction is outside of the predetermined threshold, modifying the current status of the associated traffic light based on early yellow, wherein $t_{green}$ is reduced to $t_{green}-\Delta_2 t_g$; and
- F) repeating steps A)-E) until the object has cleared the intersection.

12. The method of claim 11, wherein the object is one or more of a car, a truck, a heavy duty truck, a semitruck, a bicycle, a motorcycle, a scooter, a skateboard, and a pedestrian.

13. The method of claim 11, wherein the one or more way-sensor systems are proximate to the intersection, one or more cameras at or proximate to the intersection, global positioning systems coupled to the object, one or more cellular communication devices, one or more Bluetooth communication devices, one or more Wi-Fi communication devices, one or more short-range radio frequency communication devices, and a combination thereof.

14. The method of claim 11, wherein the predicting timing is calculated by extrapolating timing data based on the sensed position and velocity vectors.

15. The method of claim 11, wherein modifying of the current status of the associated traffic light is based on one of a decision tree, statistical model, neural network, database function, and a combination thereof.

16. The method of claim 11, further configured to communicating with a corresponding processor in the object to request maintaining velocity on the associated path until the object has passed the intersection.

17. The method of claim 16, further configured to communicating with a corresponding processor in the object to change speed at a predefined rate.

18. The method of claim 17, wherein the predefined zone includes a first zone, a second zone, and a third zone in order of distance from the intersection, and further configured to update modifying of the current status of the associated traffic light based on position and velocity vectors of the object within each of the first, second, and third zones.

19. The method of claim 11, the processor is positioned i) proximate to the intersection or ii) remote to the intersection in a computing cloud.

20. The method of claim 11, further configured to updating the predetermined threshold using an error minimization procedure, whereby error is defined as the predicted outcome vs. measured outcome of the object timing.

* * * * *